April 27, 1943.    W. H. LEBO ET AL    2,317,923
RELIEF VALVE
Filed March 18, 1940    3 Sheets-Sheet 1

INVENTORS
William H. Lebo, and
Roy L. Simpson.
BY
Arthur Le Brown
ATTORNEY

April 27, 1943. W. H. LEBO ET AL 2,317,923
RELIEF VALVE
Filed March 18, 1940 3 Sheets-Sheet 2

INVENTORS
William H. Lebo, and
Roy L. Simpson.
BY Arthur C. Brown
ATTORNEY

April 27, 1943.  W. H. LEBO ET AL  2,317,923
RELIEF VALVE
Filed March 18, 1940   3 Sheets-Sheet 3

INVENTORS
William H. Lebo, and
Roy L. Simpson.
BY Arthur C. Brown
ATTORNEY

Patented Apr. 27, 1943

2,317,923

UNITED STATES PATENT OFFICE 2,317,923

RELIEF VALVE

William H. Lebo and Roy L. Simpson, Kansas City, Mo.

Application March 18, 1940, Serial No. 324,574

6 Claims. (Cl. 137—53)

This invention relates to pressure relief valves particularly for venting low pressure vessels such as used in storing hydrocarbon fluids whereon it is desirable to maintain a predetermined pressure, usually a few ounces.

Much difficulty has been experienced with pressure relief valves of this character as they continuously leak and consequently it is difficult to maintain the desired pressure in the vessel. It is, therefore, the principal object of the present invention to provide a relief valve which is capable of operating at low pressure differentials and whereby a predetermined maximum pressure is maintained within a vessel.

Other objects of the invention are to provide a low pressure relief valve of simple and inexpensive construction; to provide a low pressure relief valve which is also adapted to actuate in response to vacuum pressures acting within a vessel as in case of sudden condensation of contained vapor or emptying the contents thereof; to provide a relief valve construction wherein the valving member seats uniformly about the periphery of the valve; and to provide for positive seating of the valving member responsive to pressure acting in the vessel.

In accomplishing these and other objects of the invention, as hereinafter pointed out, we have provided improved structure, the preferred forms of which are illustrated in the accompanying drawings, wherein.

Figure 1:
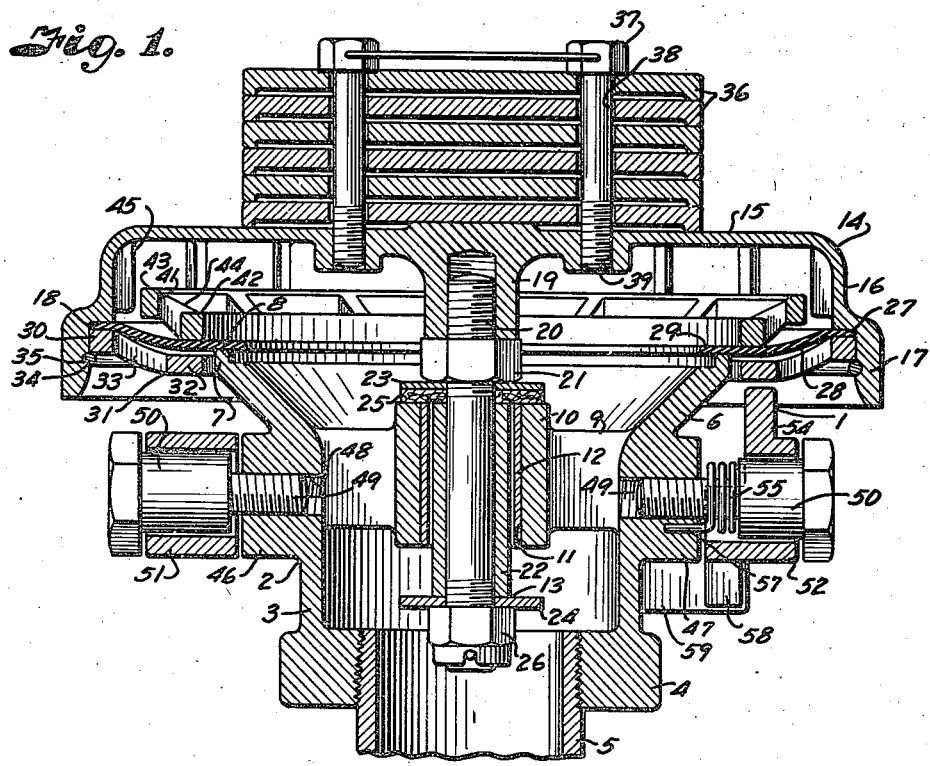
Fig. 1 is a vertical section through a pressure relief valve constructed in accordance with the present invention.

Referring more in detail to the drawings, and first to the form of the invention shown in Figs. 1 to 5 inclusive:

1 designates our preferred form of pressure relief valve which includes a body 2, having an annular wall 3 terminating at its lower edge in a flange 4 that is threaded or otherwise suitably formed for attachment to a nipple 5 or other connection with a vessel on which the release valve is installed. The upper portion of the wall 3 terminates in an outwardly flaring portion 6 having an upstanding annular rib 7 forming a circular seat 8 encircling the relief outlet opening through the valve body.

Bridging the wall 3 within the interior of the body 2 is a spider-like support 9 having a central sleeve 10 provided with an opening 11 coaxial with the seat 8. The opening 11 is preferably provided with a bushing 12 in which is reciprocably mounted the guide stem 13 of a cap 14 covering the upper end of the body 2. The cap 14 is shown as including a top 15 having an annularly depending wall 16 spaced outwardly from the seat 8 and terminating in an outwardly offset portion 17 to form a downwardly facing annular shoulder 18. Depending from the center of the top 15 is an internally threaded socket 19 receiving the threaded end of a stud 20 forming the core of the stem 13. The stud 20 is locked from rotation relatively to the cap by a jam-nut 21 which engages the end of the socket. The stud extends through a sleeve 22 which spaces washers 23 and 24 also sleeved on the stud to form stops relatively engageable with the uper and lower ends of the sleeve 10 to limit movement of the cap to and from the body member 2.

The washer 23 is preferably faced with a resilient washer 25 to abut the upper end of the sleeve 10. The washer 23, sleeve 22, and washer 24 are retained in rigid assembly against the jam-nut 21 by a nut 26 threaded on the depending end of the stud, as shown in Fig. 1.

The spacing sleeve 22 is of sufficient length to allow ample movement of the cap from the body member to give ample flow passage for the relief of pressure, as later described.

Seated against the shoulder 18 is the outer marginal edge 27 of a flexible valving member in the form of a ring 28, which is of sufficient width to bridge the spacing between the seat 8 and the wall 16 of the cap flange so that its inner marginal edge 29 overlaps the seat 8 as clearly shown in Fig. 1. The valving ring 28 is retained against the shoulder 18 by the outer rim 30 of a grid-like support 31, having an inner rim 32 loosely encircling the rib 7. The rim 32 is offset downwardly with respect to the rim 30 and is connected therewith by spaced arms 33 which form support for the flexible valving ring and prevent sagging thereof under pressure acting from within the cap. The grid-like supporting ring 31 is retained in clamping contact with the outer marginal edge 27 of the valving member by an expansion ring 34 received in a locking groove 35 formed in the inner face of the offset portion 16 of the cap flange. With this arrangement the outer portion of the valving ring is anchored to the cap and the inner marginal edge engages the seat 8 and is retained in sealing contact therewith by pressure from the vessel acting through the nipple 5.

The cap 14 is of sufficient weight, or weighted by a plurality of disks 36, so that it normally remains seated with the washers 23 and 25 resting upon the spider sleeve 10, a sufficient number of disks 36 being applied to maintain a predetermined pressure within the vessel before the pressure is sufficient to lift the cap and effect unseating of the valving ring from the seat 8. The disks 36 are preferably retained on the cap by cap-screws 37 having their shanks extending through openings 38 in the disks and into threaded sockets 39 formed in the top 15 of the cap. After application of the required number of disks, the screws may be sealed by a wire to indicate unauthorized tampering therewith.

In order to assure seating of the valving ring on the seat 8, the valving ring 28 supports a weight 41 of ring-like character and which includes an inner rim 42 seated on the valving ring in outwardly spaced relation with the seat 8 and an outer rim 43 that is offset upwardly from the rim 42 by arms 44. The weight ring is retained in approximately centered position by guide ribs 45 which project inwardly from the inner face of the cap wall 16.

Figure 2:
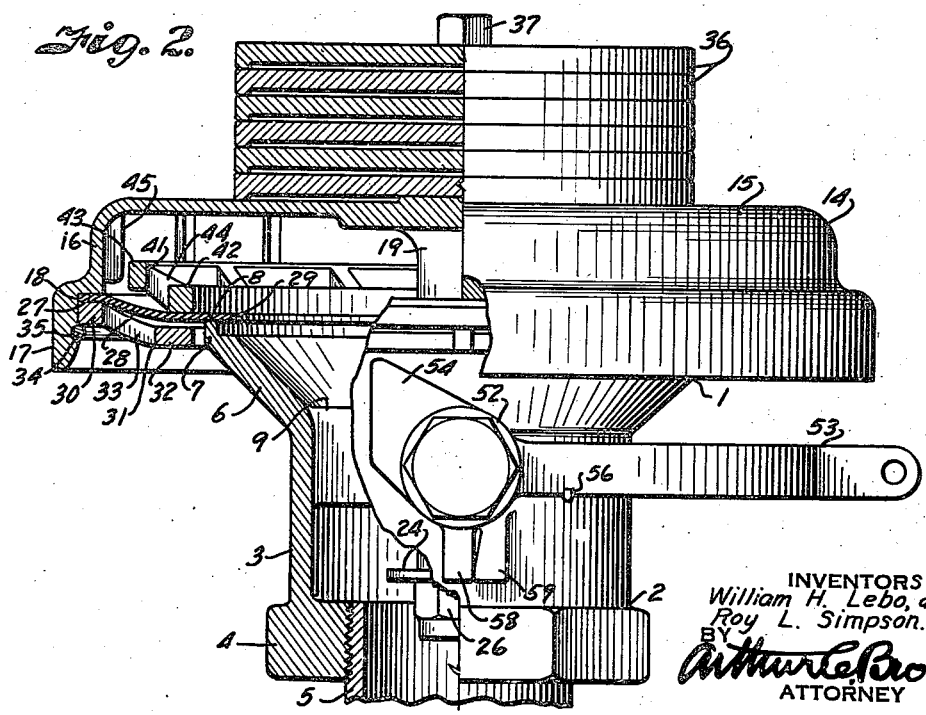
Fig. 2 is an elevational view of the valve, part of which is shown in vertical section at right angles to the section shown in Fig. 1.
Figure 3:
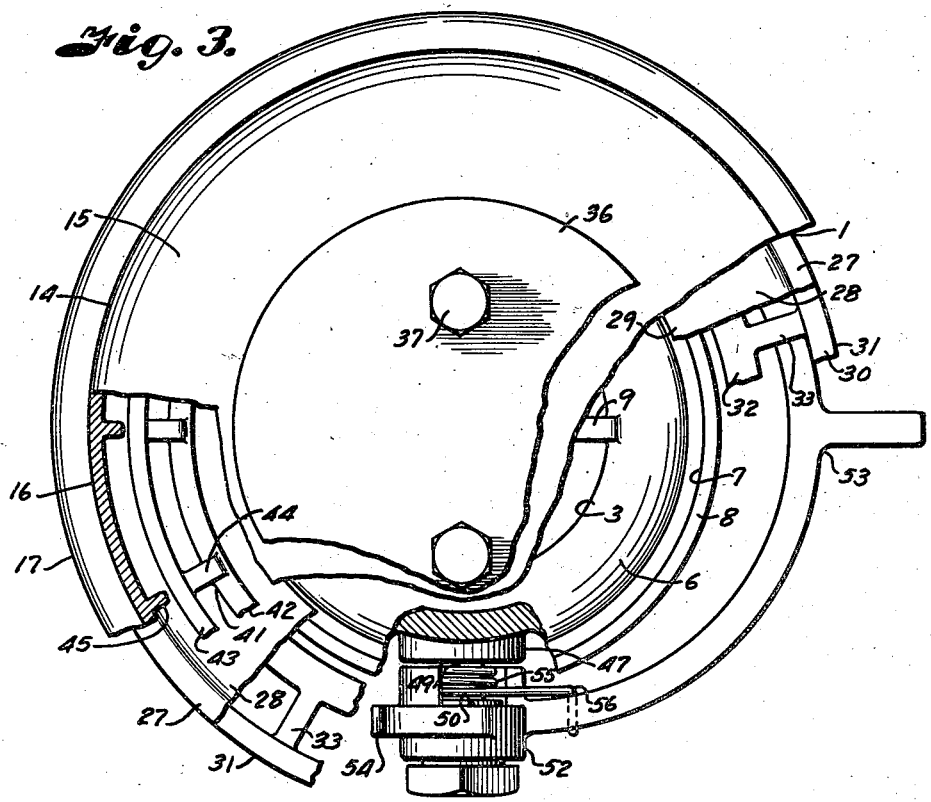
Fig. 3 is a plan view of the valve, parts of which are broken away to better illustrate the construction thereof.

Extending outwardly from offset sides of the wall 3 are bosses 46 and 47 having threaded openings 48 therein to receive the threaded shanks 49 of trunnions 50. The trunnions 50 form pivots for bearing sleeves 51 and 52 on a yoke-like actuating lever 53. Extending from one of the bearing sleeves is a cam-like lug 54 that is adapted to engage under the rim 32 to raise the cap and effect unseating of the valving ring when the lever 53 is manually operated. The lever 53 is normally retained in retracted position by a coil spring 55 sleeved on one of the trunnion shanks and having one end 56 fixed to the lever and its opposite end 57 engaged in a socket formed in the end of the boss 47. Movement of the lever responsive to action of the spring is limited by a lug 58 engaging against a lug 59 projecting from the outer face of the wall 3 as shown in Fig. 2.

Figures 4, 5:
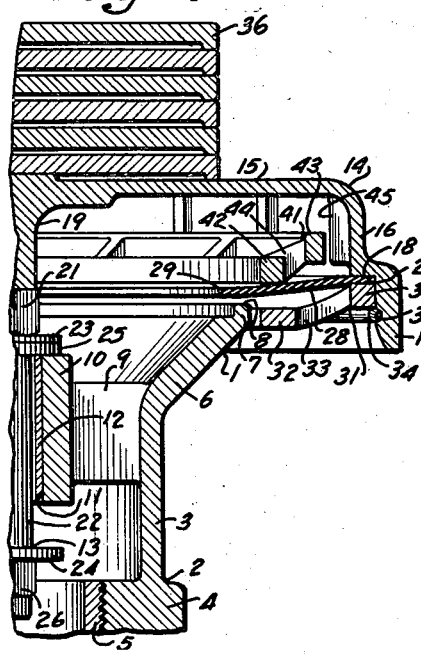
Fig. 4 is a vertical section through one side of the valve showing the valve in position for relieving pressure.
Fig. 5 is a similar section but showing the valving member unseated responsive to vacuum acting within a vessel to which the valve may be connected.

Assuming that the relief valve constructed as described is mounted on a vessel for containing liquids under a predetermined pressure, the valving ring will remain engaged with the seat 8 responsive to the pressure acting on the upper face of the ring. The valving ring is, therefore, uniformly pressed against the seat about its entire periphery so as to prevent leakage thereunder. When the pressure begins to exceed the predetermined pressure, the pressure acts against the cap and since the cap is of larger area than the effective area of the valving ring, the cap is lifted by the excess pressure so that the valving ring is raised from its seat and the excessive pressure is vented between the valving ring and seat as shown in Fig. 4. When the pressure is reduced to the predetermined maximum, the cap settles to its original position, again seating the valving ring and preventing further discharge from the vessel. Should a vacuum occur in the vessel responsive to sudden condensation of contained gases, or upon emptying the contents of the vessel, the external air pressure, acting on the under side of the valving ring, effects unseating thereof against weight ring 41 so that the air may enter the tank and prevent collapse thereof. When the vacuum is relieved, the weight 41 is again effective in restoring the valving ring on its seat so that the predetermined pressure may be again built up within the vessel.

Figure 6:
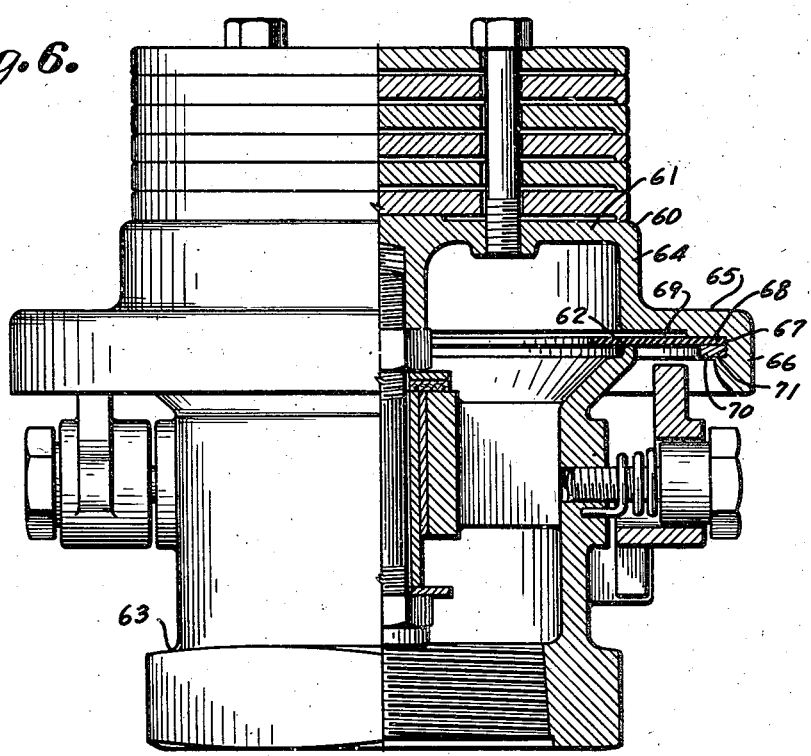
Fig. 6 is an elevation of a modified form of the invention, part of which is shown in vertical section.

The form of the invention shown in Fig. 6 is the same as that just described with the exception of the cap 60. In this instance the top 61 of the cap substantially conforms to the diameter of the seat 62 on the body member 63 and the side flange 64 thereof terminates in a laterally extending annular flange 65 to space a depending rim 66 thereof a sufficient distance from the seat to accommodate the valving ring 67. The under face of the flange 65, except for the clamping portion 68, is relieved as at 69 to permit pressure within a vessel to act on the upper face of the valving ring. The valving ring is retained in clamping contact with the shoulder by an expansion ring 70 inset within a groove 71 formed in the inner face of the rim 66. In this construction the under support for the valving ring is eliminated.

The operation of the device just described is the same as that of the preferred form.

Figure 7:
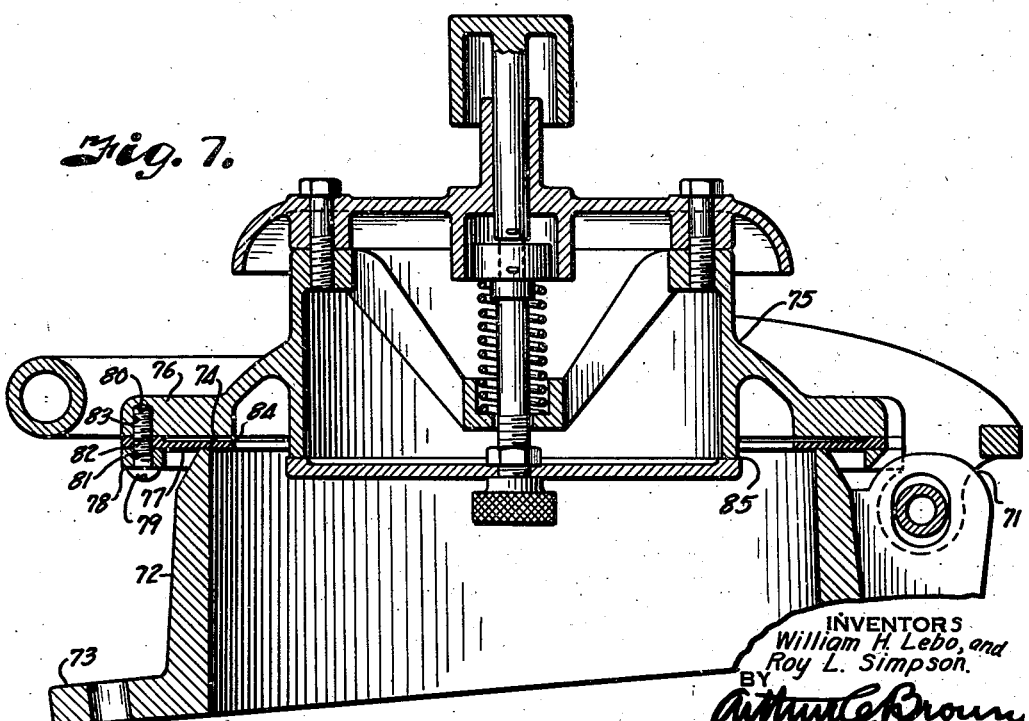
Fig. 7 is a vertical section through a further modified form of the invention, showing its adaptability to a thief hatch cover.

In Fig. 7 we have shown the invention as incorporated in a thief hatch, the thief hatch including a collar-like body 72 having a footing flange 73 adapted for attachment to the roof of a vessel. The upper portion of the collar terminates in a seat 74 for seating a hatch cover 75. The hatch cover 75 includes a closure plate 76 of a larger diameter than the seat 74 so that the outer marginal edge of a valving ring 77 may be attached to the under side of the cover in outwardly spaced relation with the seat 74. In the illustrated instance the valving ring 77 is secured by a clamping ring 78 retained in clamping engagement with the valving ring by screws 79 having threaded shanks 80 extending through openings 81 in the rings 78 and 82 in the valving ring 77 and into threaded sockets 83 of the cover as shown in Fig. 7. The inner portion of the valving ring is of reduced thickness so that it is completely flexible to engage the seat 74 and provide space 84 under the cover to allow pressure to act upon the valving ring until such a time that the pressure is sufficient to raise the cover. The hatch cover may be pivotally secured to the collar-like body 72 as in accordance with approved practice. The hatch cover may also be provided with a vacuum relief valve 85 as the valving ring cannot be depended upon for effecting relief of vacuum in the vessel.

From the foregoing it is obvious that we have provided a relief valve construction wherein the valving ring is automatically retained in seated condition by pressure acting thereon so as to prevent leakage of the pressure below a predetermined maximum. However, should the pressure exceed the predetermined maximum, the cap of the relief valve is lifted thereby to effect unseating of the valving ring against the pressure acting thereon. It is also obvious that the valving rings in the forms of the devices shown in Figs. 1 to 6 inclusive serve to relieve vacuum occurring in the vessels with which they are used.

Attention is directed to the fact that the weight of the cap or cover is independent of the sealing portions of the valving ring so that the sealing portions are required to form only a seal with the valve seats, thereby avoiding any deformity of the valving ring which would ordinarily interfere with continuous seal thereof.

What we claim and desire to secure by Letters Patent is:

1. A relief valve of the character described, including a valve body having a circumferential seat encircling a relief opening in said body, a cap for said body having a valving ring anchoring portion spaced radially from said seat to provide a passageway therebetween, means supporting the cap on said body for movement away from the seat, and a flexible valving ring covering said passageway and having its outer margin secured to said anchoring portion of the cap and its inner marginal edge encircling the relief opening and arranged to engage said seat to close said passageway under weight of said cap and movable from said seat independently of movement of the cap when the pressure in said passageway exceeds the pressure acting through the relief opening.

2. A relief valve of the character described, including a ring-like body having a circumferential seat encircling a relief opening through said body, a cap for said body having a valving ring anchoring portion spaced from said seat to provide a passageway therebetween, means supporting the cap on said body for movement away from the seat, a flexible valving ring encircling the relief opening in covering relation with said passageway, means fixing the outer margin of said ring to said anchoring portion of the cap with its inner marginal edge arranged for support on said seat to close said passageway, and a support in said passageway for supporting the valving ring circumferentially of said body.

3. A relief valve of the character described including a body having a circumferential seat encircling a relief opening through said body, a cap having a stem, means slidably supporting the stem on said body, stop means on the stem for limiting movement of the cap, said cap having an annular flange spaced radially from said seat and extending circumferentially thereof to form a circumferential outlet passageway, a flexible valving ring covering said passageway, and means for clamping the outer marginal edge of the valving ring to said flange, the inner marginal edge of the valving ring engaging said seat and being freely flexible to disengage said seat responsive to pressure acting on said valving ring through said passageway.

4. A relief valve of the character described, including a ring-like body having a circumferential seat, a cap having a depending flange spaced outwardly from said seat and provided with an annular shoulder, a valving ring engaging the shoulder and overlapping said seat, a clamping ring carried by the flange to clamp the valving ring against said annular shoulder, and a support for said valving ring encircling the ring-like body and carried by said clamping ring in supporting relation with the valving ring.

5. A relief valve of the character described, including a ring-like body having a circumferential seat, a cap having a depending flange spaced outwardly from said seat and provided with an annular shoulder, a valving ring engaging the shoulder and overlapping said seat, a clamping ring carried by the flange to clamp the valving ring against said annular shoulder, a ring encircling the ring-like body and carried by said clamping ring in supporting relation with the valving ring, and a lever pivotally supported on said ring-like body and having an arm engageable with said supporting ring to unseat the valving ring.

6. In a relief valve of the character described, a valve body having a circumferential seat, a flexible valving ring, means clampingly supporting the outer marginal edge of the valving ring, means movably carrying the clamping means on the valve body, and means yieldingly retaining the inner marginal edge of the valving ring for movement to and from said seat independently of movement of the supporting means.

WILLIAM H. LEBO.
ROY L. SIMPSON.